United States Patent [19]

De With et al.

[11] Patent Number: 5,530,481
[45] Date of Patent: Jun. 25, 1996

[54] VIDEO ENCODER/DECODER FOR ENCODING/DECODING MOTION COMPENSATED IMAGES

[75] Inventors: Peter H. N. De With, Eindhoven, Netherlands; Roeland Den Bakker, Zeewolde, both of Netherlands

[73] Assignee: U.S. Philips Corporation, New York, N.Y.

[21] Appl. No.: 268,709

[22] Filed: Jun. 29, 1994

[30] Foreign Application Priority Data

Jun. 29, 1993 [BE] Belgium ............... 09300666

[51] Int. Cl.⁶ ............... H04N 7/26; H04N 7/28
[52] U.S. Cl. ............... 348/415; 348/416; 348/405; 348/402; 348/699; 348/700
[58] Field of Search ............... 348/416, 415, 348/420, 411, 409, 699, 700

[56] References Cited

U.S. PATENT DOCUMENTS

| | | | |
|---|---|---|---|
| 4,897,720 | 1/1990 | Wu et al. | 348/411 |
| 5,068,722 | 11/1991 | Sugiyama | 348/420 |
| 5,140,437 | 8/1992 | Yonemitsu et al. | 348/420 |
| 5,200,820 | 4/1993 | Gharavi | 348/420 |
| 5,227,878 | 7/1993 | Puri et al. | 348/416 |
| 5,247,586 | 9/1993 | Gobert et al. | 348/420 |
| 5,274,442 | 12/1993 | Murakami et al. | 348/409 |
| 5,278,663 | 1/1994 | Hong | 348/416 |
| 5,327,248 | 7/1994 | Miller et al. | 348/415 |

FOREIGN PATENT DOCUMENTS 0509594  10/1992  European Pat. Off.  ........ G11B 20/10

OTHER PUBLICATIONS

"Digitale Bildcodierung, Bewegungskompensierte Interframe–DPCM", FKT Jun./1992, pp. 416–424.

Vos, "VLSI–architectures for the hierarchical block–matching algorithm for HDTV applications", SPIE, vol. 1360, Visual Communications & Image Processing, '90, pp. 398–409.

*Primary Examiner*—Thai Q. Tran
*Assistant Examiner*—Anand Rao
*Attorney, Agent, or Firm*—Michael E. Marion

[57] ABSTRACT

Video encoder and decoder, provided with a motion compensator for motion-compensated video coding or decoding in which a picture is coded or decoded in blocks in alternately horizontal and vertical steps. The motion compensator is provided with addressing means (160) and controlled multiplexers (111–119) for refreshing a search area memory (101–109) at each step, in conformity with the direction of the step.

8 Claims, 4 Drawing Sheets

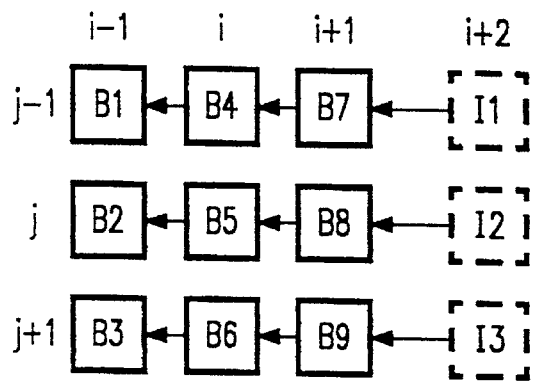
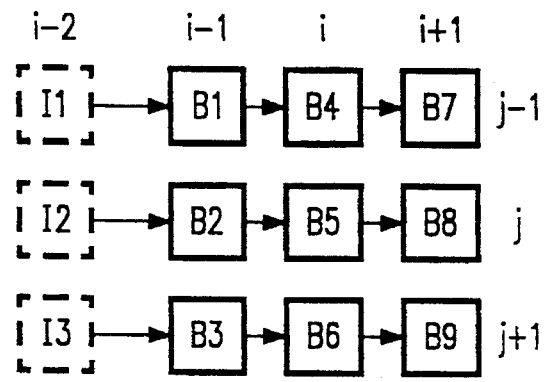
FIG.6A  FIG.6B
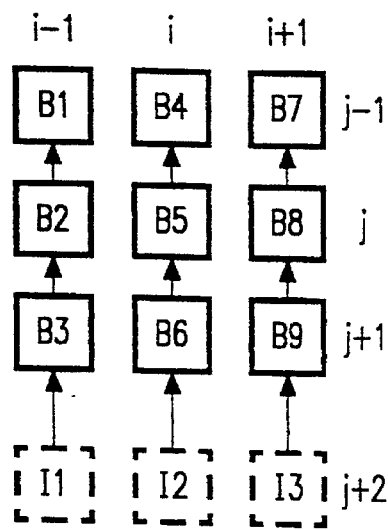
FIG.6C
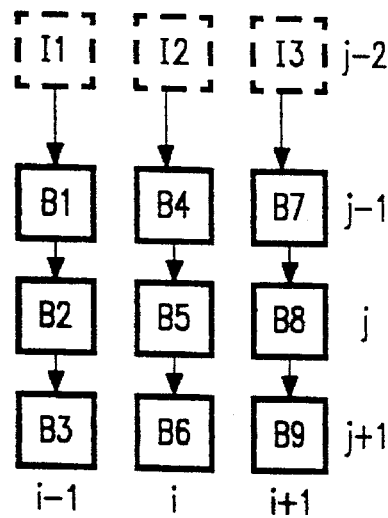
FIG.6D

VIDEO ENCODER/DECODER FOR ENCODING/DECODING MOTION COMPENSATED IMAGES

FIELD OF THE INVENTION

The invention relates to a video encoder for blockwise encoding motion-compensated video images, provided with a motion compensator comprising a search area memory for storing a plurality of contiguous blocks of pixels of a prediction image. The invention also relates to a video decoder for decoding video images.

DESCRIPTION OF THE PRIOR ART

In digital coding of television pictures a high degree of compression is the general aim in order to limit the quantity of data as much as possible without any loss of picture quality. To this end the picture to be encoded is divided into blocks of, for example 8*8 pixels. These blocks are subsequently subjected to, for example picture transform and variable-length coding. A high degree of compression is achieved by means of interframe or interfield coding. In this mode not every individual frame or field is encoded but the difference between the current frame or field and its prediction is coded. The article "Digitale Bildcodierung, Bewegungskompensierte Interframe-DPCM", FKT 6/1992, pp. 416–424 describes that a still higher degree of compression is achieved if the prediction image is compensated with respect to motion. For each block of the current picture a block of the prediction image corresponding as much as possible to this picture is searched. This operation is also referred to as block matching. The relative coordinates of the block found with respect to the current block constitute a motion vector which is coded and transmitted.

The circuit which searches and supplies corresponding blocks of the current picture in the prediction image is referred to as motion compensator. Generally, the motion compensator compares each block of the current picture only with data in the neighbourhood of the corresponding block of the prediction image. The search area has a size of 3*3 blocks, i.e. 24*24 pixels.

A significant problem in the implementation of motion compensators is the organization of the search area memory. On the one hand, the possibility of random access to the stored pixels is necessary for the block-matching operation. On the other hand, provisions are necessary for forming a new search area after each block-matching operation. This operation of forming a new search area will hereinafter be referred to as refreshing of the search area. The motion compensators hitherto known process the picture generally in "stripes". As is shown in FIG. 1, the blocks of the current picture are scanned from left to right. Such a fixed scanning sequence renders the refreshing of the search area memory relatively simple. Only a portion of the search area memory needs to be replaced by new pixels of the prediction image and other, already stored pixels within the search area are moved. For the purpose of explanation, FIG. 2 shows a search area memory having a size of 9 blocks (B1 ... B9). Block B5 is a block of the prediction image having the same block coordinates (i,j) as the currently processed block of the current picture (shaded in FIG. 1). After the block-matching operation, each block moves one position to the right and the blocks B1, B2 and B3 are filled with new blocks of the prediction image. As is shown in FIG. 2, a first-in-first-out structure of the search area memory is sufficient for this refreshing operation of the search area memory. This structure is therefore used in known embodiments of motion compensators.

However, not all video encoders process the picture in stripes. For example, European Patent Application EP 0 509 594 describes a video recorder which encodes and records the blocks in a shuffled sequence in order to obtain a better quality upon display at a faster speed. A shuffled sequence is herein understood to mean that successively processed blocks are contiguous blocks, but that they are also scanned from right to left and from bottom to top. This video recorder is not provided with a motion compensator.

OBJECT AND SUMMARY OF THE INVENTION

It is an object of the invention to provide a video encoder and decoder which are also applicable for a shuffled sequence of blocks.

According to the invention the video encoder and decoder comprise means for determining a scanning sequence in which the blocks of pixels of the video image are encoded. The motion compensator comprises addressing means for applying blocks of pixels of the prediction image to the search area memory in dependence upon the scanning sequence, and control means for moving, in dependence upon the scanning sequence, blocks of pixels within the search area memory and storing the applied blocks of pixels in the search area memory. It is thereby achieved that the motion compensator cannot only operate from left to right but also from top to bottom, and vice versa.

In a preferred embodiment of the encoder and decoder the control means are constituted by multiplexers for selectably moving blocks within the search area and for selecting the applied blocks of pixels. In such an embodiment the relatively simple and inexpensive serial memory structure may be largely maintained.

BRIEF DESCRIPTION OF THE FIGURES

FIGS. 6A to 6D show possible modes of refreshing a search area in the motion compensator of FIG. 5.

DESCRIPTION OF EMBODIMENTS

Figure 3:
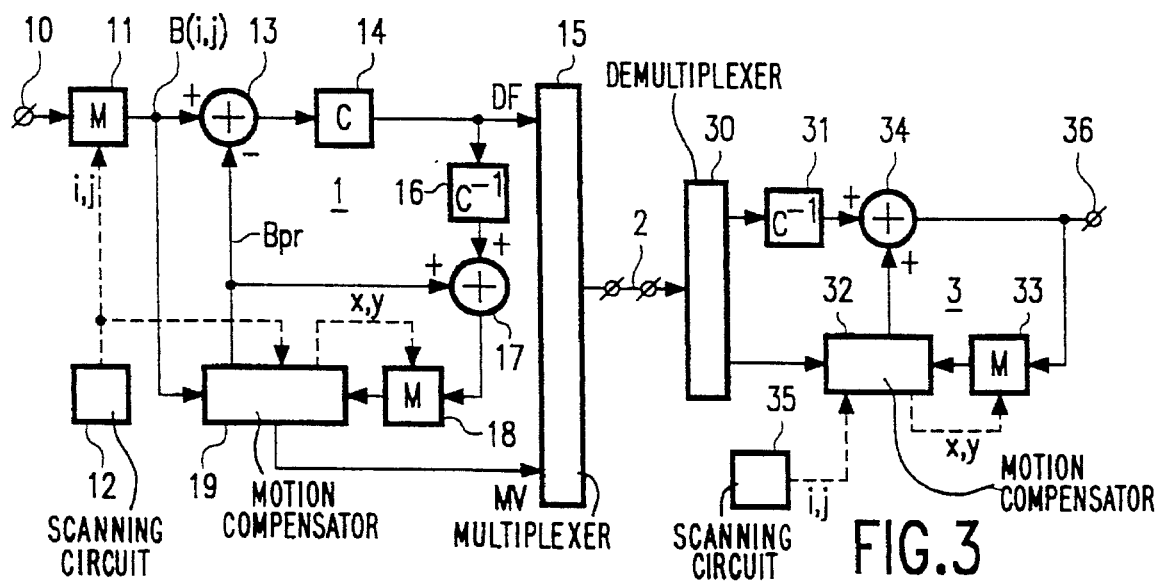
FIG. 3 shows diagrammatically a video transmission system with a video encoder and decoder according to the invention.

FIG. 3 shows diagrammatically a video transmission system with a video encoder and decoder according to the invention. The system comprises a video encoder 1, a transmission channel 2 and a video decoder 3. The transmission system shown may be a video recorder in practice. In that case transmission channel 2 is constituted as a storage medium.

Encoder 1 receives a digital video signal at an input 10. The received pictures are stored in a first picture memory 11 and applied in blocks from this memory to a subtracter circuit 13. In the subtracter circuit a motion-compensated prediction image is subtracted from the current image. The difference image obtained is encoded in a coding circuit 14 (for example, by means of Discrete Cosine Transform and quantization of the coefficients obtained therefrom). The encoded difference image DF is transmitted via a multiplexer 15. The transmitted difference image is also regained in a decoding circuit 16 and added in an adder circuit 17 to the current prediction image in order to constitute the next prediction image in a second picture memory 18. A motion compensator 19 receives the current image from picture memory 11 and the prediction image from picture memory 18 and supplies the motion-compensated prediction image to the subtracter circuit 13. Moreover, the motion compensator supplies motion vectors MV which are also transmitted via the multiplexer 17.

Figure 1:
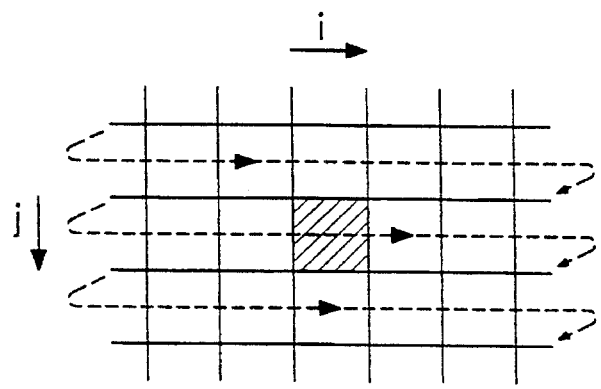
FIG. 1, which has already been described, shows the sequence in which blocks of pixels of a known video encoder and decoder are processed.
Figure 2:
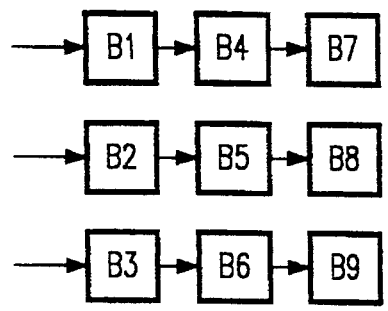
FIG. 2, which has already been described, shows the memory structure of the search area memory of the motion compensator of a known video encoder or decoder.
Figure 4:
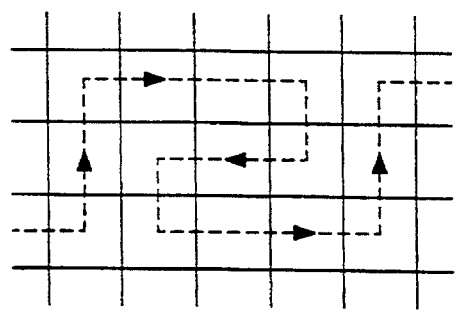
FIG. 4 shows a possible scanning sequence of blocks of pixels in the system shown in FIG. 3.

The picture memory 11 in the encoder is read in blocks. As is shown in the Figure, the picture memory successively receives the block coordinates (i,j) of a block B(i,j) to be read of the current image from a scanning circuit 12. It will hereinafter be assumed that each block comprises 8*8 pixels The successively applied block coordinates define the sequence in which the picture memory 11 is read. FIG. 4 shows a scanning sequence which has been found to be useful for video recorders because it yields an acceptable picture quality upon fast display. In contrast to FIG. 1, scanning is not only effected from left to right but also from top to bottom, and vice versa. The block coordinates are also applied to the motion compensator 19 in order that this compensator can always form a search area around the corresponding block $B_{pr}(i,j)$ of the prediction image. The mode of refreshing the search area memory previously shown with reference to FIG. 2 is no longer adequate for this scanning sequence. It will be evident that refreshing of the search area memory should be in conformity with the scanning sequence.

Figure 5:
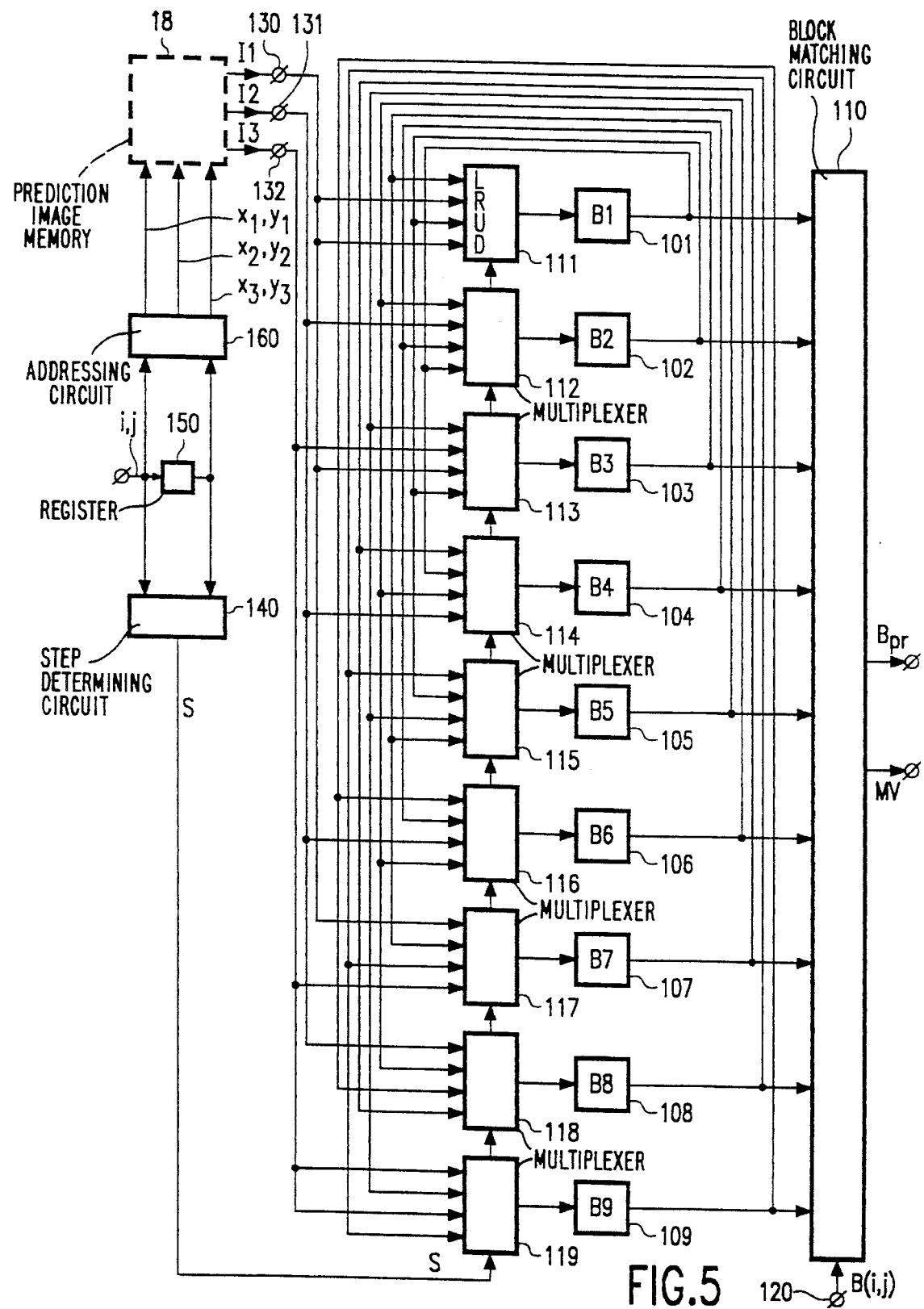
FIG. 5 shows an embodiment of a motion compensator in the video encoder of FIG. 3.

FIG. 5 shows an embodiment of the motion compensator in video encoder 1. The motion compensator comprises nine sub-memories 101–109 each of which stores a block of 8*8 pixels of the prediction image. The sub-memories jointly constitute a search area memory having a size of 3*3 blocks. They are further denoted as B1–B9 in conformity with the designations shown in FIG. 2. In other words, sub-memory B5 comprises a block $B_{pr}(i,j)$ of the prediction image with the same block coordinates as the currently processed block B(i,j) of the current image. The other sub-memories comprise the blocks of the prediction image surrounding this block.

For the purpose of the block-matching operation of the motion compensator, the pixels stored in the search area memory are applied to a block-matching circuit 110. An input 120 of this circuit also receives the current block B(i,j) of the picture to be encoded. The block-matching circuit searches a block $B_{pr}$ of 8*8 pixels in the search area, which block corresponds as much as possible to the current block B(i,j) and applies this to the subtracter circuit 13 (see FIG. 3) of the video encoder. Moreover, the block-matching circuit determines the relative coordinates of the found block with respect to the current block coordinates (i,j) and outputs them in the form of a motion vector MV to be transmitted. This block-matching operation is complicated, but is further generally known. See, for example, "VLSI-architectures for the hierarchical block-matching algorithm for HDTV applications" in SPIE, Vol. 1360, Visual Communications and Image Processing, '90, pp. 398–409.

For refreshing the search area memory after each block-matching operation, the motion compensator comprises multiplexers 111–119. These multiplexers couple the data input of each sub-memory selectively to the data outputs of other sub-memories and to inputs 130–132. Selected blocks I1, I2 and I3 of the prediction image memory 18 (see FIG. 3) are received via said inputs. Each multiplexer has four inputs which are successively denoted by L, R, U and D. The multiplexers further receive a selection signal S with which one of the inputs is selected. The selection signal S is generated by a step-determining circuit 140. This circuit receives the block coordinates (i,j) of the block B(i,j) to be encoded and, via a register 150, the block coordinates of the previous block. By comparing the two block coordinates, the step-determining circuit fixes the scanning direction of the current image, in other words whether a step to the right, the left, upwards or downwards has been made. In conformity therewith, the selection signal S assumes one of the values L, R, U or D.

The motion compensator further comprises an addressing circuit 160. This circuit also receives the block coordinates of the current and the previous block. It supplies three block coordinates $(x_1,y_1)$, $(x_2,y_2)$ and $(x_3,y_3)$ which are applied to the prediction picture memory 18. The prediction picture memory thereupon supplies the three previously mentioned blocks I1, I2 and I3 of 8*8 pixels. These blocks are applied to the inputs 130–132 of the motion compensator.

Various embodiments of the step-determining circuit 140 and the addressing circuit 160 are possible. These can be realised by those skilled in the art without any further inventiveness with reference to the following truth Table. The first column of this Table states the block coordinates of the previous block as supplied by register 150.

|  | S | $x_1, y_1$ | $x_2, y_2$ | $x_3, y_3$ |
| --- | --- | --- | --- | --- |
| i + 1, j | L | i + 2, j − 1 | i + 2, j | i + 2, j + 1 |
| i − 1, j | R | i − 2, j − 1 | i − 2, j | i − 2, j + 1 |
| i, j + 1 | U | i − 1, j + 2 | i, j + 2 | i + 1, j + 2 |
| i, j − 1 | D | i − 1, j − 2 | i, j − 2 | i + 1, j − 2 |

As regards refreshing of the search area, the motion compensator shown in FIG. 5 operates as follows. After the most corresponding block $B_{pr}$ of pixels has been searched in the search area, the motion compensator receives new block coordinates B(i,j). Four cases are feasible:

(i) The previous block coordinates were (i+1,j). The selection signal S then has the value L (left). Each multiplexer now couples the first input (L) to the respective sub-memory. Consequently, B1 takes over the contents from B4, B2 from B5, B3 from B6, B4 from B7, B5 from B8 and B6 from B9. Sub-memory B7 receives a new block I1 from the prediction picture memory, which block has the block coordinates (i+2,j−1) in accordance with the truth Table. B8 receives block I2 with block coordinates (i+2,j) and B9 receives block I3 with block coordinates (i+2,j+1). The shift of previously stored pixels and the storage of new pixels is summarized in FIG. 6A.

(ii) The previous block coordinates were (i−1,j). The selection signal S now has the value R (right) and each multiplexer couples the second input (R) to the respective sub-memory. The pixels in the search area memory now move one block size to the right. Sub-memory B1 receives a new block I1 with block coordinates (i−2,j−1) from the prediction picture memory. B2 receives I2 with block coordinates (i−2,j) and B3 receives I3 with block coordinates (i−2,j+1). The refreshing of the search area is shown in FIG. 6B.

(iii) The previous block coordinates were (i,j+1). The selection signal S now has the value U (up) and each multiplexer couples the third input (U) to the respective sub-memory. The pixels in the search area memory now move one block size upwards. Sub-memory B3 receives a new block I1 with block coordinates (i−1,j+2) from the prediction picture memory. B4 receives I2 with block coordinates (i,j+2) and B7 receives I3 with block coordinates (i+1,j+2). The refreshing of the search area is shown in FIG. 6C.

(iv) The previous block coordinates were (i,j−1). The selection signal S now has the value D (down) and each multiplexer couples the fourth input (D) to the respective sub-memory. The pixels in the search area memory now move one block size downwards. Sub-memory B1 receives a new block I1 with block coordinates (i−1,j−2) from the prediction picture memory. B4 receives I2 with block coordinates (i,j−2) and B7 receives I3 with block coordinates (i+1,j−2). The refreshing of the search area is shown in FIG. 6D.

An identical organization of the search area memory is applicable in the decoder of the transmission system. As is shown in FIG. 3, the decoder 3 comprises a demultiplexer 30 which applies the encoded difference image DF and the motion vectors MV to a decoding circuit 31 and a motion compensator 32, respectively. The decoder further comprises a prediction picture memory 33, an adder circuit 34 for reconstructing the received picture and a scanning circuit 35 for supplying successive block coordinates (i,j). The reconstructed picture is applied to an output 36 of the decoder.

Figure 7:
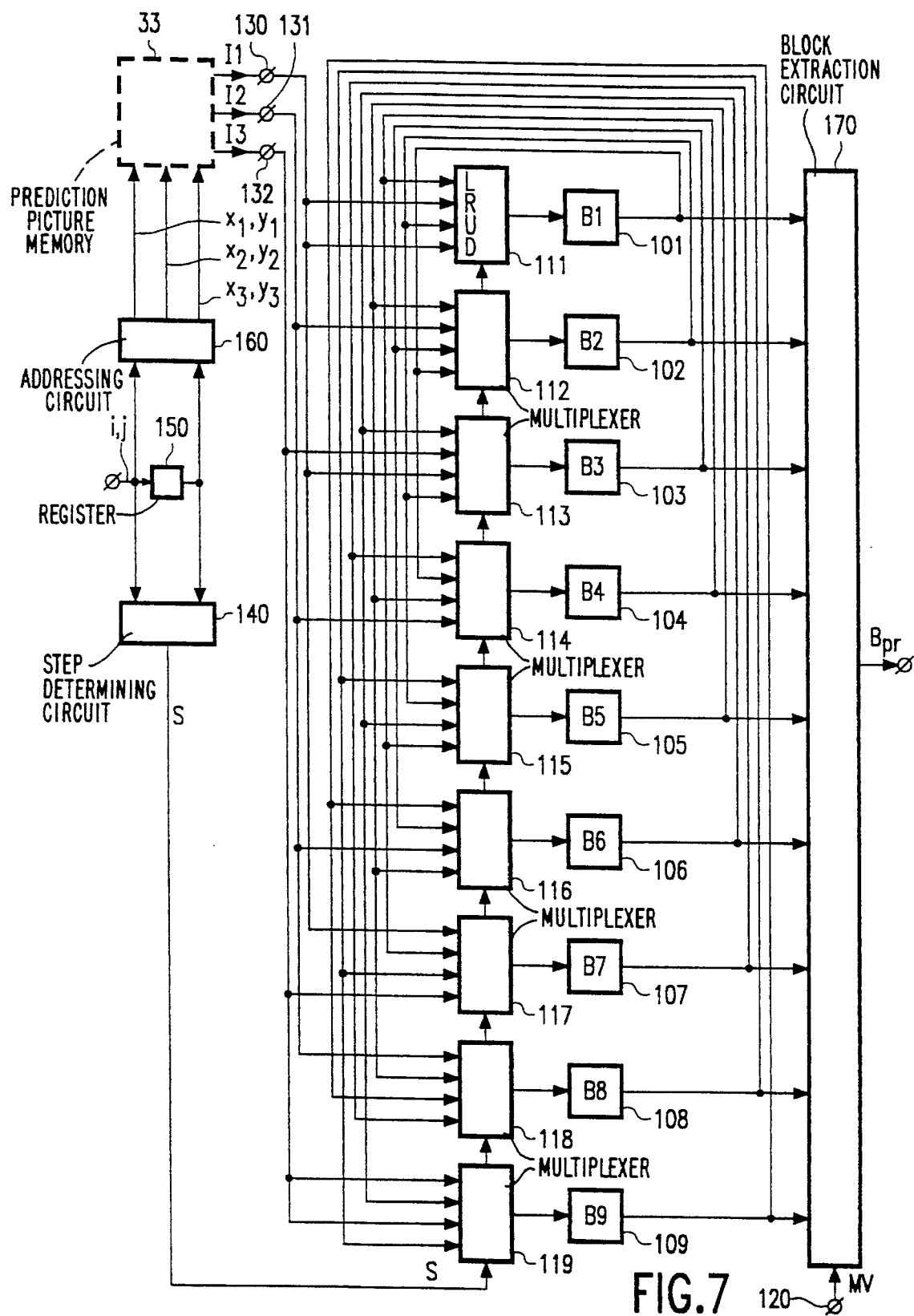
FIG. 7 shows an embodiment of a motion compensator in the video decoder of FIG. 3.

FIG. 7 shows the motion compensator 32 in the video decoder 3. It is distinguished from the motion compensator shown in FIG. 5 only by the absence of the block-matching circuit (110 in FIG. 5). The motion compensator now comprises a block extraction circuit 170 to which the "search" area (B1 ... B9) and the motion vector are applied (input 120). With reference to the motion vector, the circuit determines the relative coordinates (with respect to block B5) of a block of 8*8 pixels and outputs this block. The block extraction circuit is further generally known.

The motion compensator shown in FIGS. 5 and 7 thus renders four separate scanning directions possible while maintaining the simple first-in-first-out structure of the search area memory. If, as in the relevant case, a contiguous block of pixels is coded each time, no more than three new blocks of pixels need to be supplied from the prediction picture memory. In this way, a flexible motion compensator is obtained without stricter requirements as regards data transfer, as compared with the known motion compensators which operate from left to right.

It is to be noted that the motion compensator need not necessarily receive the block coordinates (i,j) from the exterior. It is equally feasible for the scanning sequence to vary in accordance with a defined pattern. In that case it is sufficient to apply a clock pulse to the motion compensator, which clock pulse marks the start of a picture, in response to which the motion compensator generates the successive block coordinates (or the values L, R, U and D of the selection signal S) independently.

We claim:

1. A video encoder (1) or decoder (3) for blockwise encoding or decoding motion-compensated video images, provided with a motion compensator (19) comprising a search area memory (101–109) for storing a plurality of contiguous blocks of pixels of a prediction image corresponding to a search area around a current block of pixels being encoded or decoded, wherein the video encoder and decoder comprise means (12) for determining a scanning sequence direction leading from a current block of pixels to a next block of pixels being encoded or decoded, and in that the motion compensator further comprises:

addressing means (160) for supplying to the search area memory blocks of pixels of the prediction image located immediately adjacent to the search area in the determined scanning sequence direction; and control means (111–119) for moving the search area by one block in the determined scanning sequence direction, and for shifting blocks of pixels within the search area memory by one block in a direction opposite to the determined scanning sequence direction thereby vacating block positions in the search area memory and for storing the blocks of pixels supplied by the addressing means in the vacated block positions of the search area memory.

2. A video encoder or decoder as claimed in claim 1, in which the search area memory comprises a plurality of block memories (101–109) and in which the control means are constituted by multiplexers (111–119) for selectably coupling the input of a block memory to outputs of predetermined other block memories or to inputs (130–132) for receiving the supplied blocks of pixels.

3. A video recorder provided with a video encoder and decoder as claimed in claim 1.

4. A video encoder or decoder as claimed in claim 2, in which the control means are provided with a step-determining circuit (140) for deriving a selection signal (S) from successive block coordinates for controlling the multiplexers, said selection signal step-wise representing the scanning sequence direction.

5. A video encoder or decoder as claimed in claim 2, in which the addressing means (160) are adapted to generate coordinates of the supplied blocks of pixels of the prediction image from successive block coordinates.

6. A video recorder provided with a video encoder and decoder as claimed in claim 2.

7. A video recorder provided with a video encoder and decoder as claimed in claim 5.

8. A video recorder provided with a video encoder and decoder as claimed in claim 3.

* * * * *